(12) United States Patent
Cromer et al.

(10) Patent No.: US 9,577,982 B2
(45) Date of Patent: *Feb. 21, 2017

(54) METHOD AND APPARATUS FOR EXTENDING REMOTE NETWORK VISIBILITY OF THE PUSH FUNCTIONALITY

(71) Applicant: BOMGAR CORPORATION, Ridgeland, MS (US)

(72) Inventors: Nathan Cromer, Brandon, MS (US); Jeremy Raymond Cross, Kelowna (CA); David William Durham, Raymond, MS (US); Nathan Joel McNeil, Brandon, MS (US); Huey-Jiun Ngo, Flowood, MS (US); Ryan D. Sleevi, Orlando, FL (US)

(73) Assignee: BOMGAR CORPORATION, Ridgeland, MS (US)

( * ) Notice: Subject to any disclaimer, the term of this patent is extended or adjusted under 35 U.S.C. 154(b) by 450 days.

This patent is subject to a terminal disclaimer.

(21) Appl. No.: 13/649,774

(22) Filed: Oct. 11, 2012

(65) Prior Publication Data

US 2013/0036206 A1 Feb. 7, 2013

Related U.S. Application Data

(63) Continuation of application No. 12/058,165, filed on Mar. 28, 2008, now Pat. No. 9,350,701.

(51) Int. Cl.
| | |
|---|---|
| G06F 7/04 | (2006.01) |
| H04L 29/06 | (2006.01) |
| H04L 29/08 | (2006.01) |
| G06F 15/16 | (2006.01) |

(52) U.S. Cl.
CPC .............. *H04L 63/02* (2013.01); *H04L 67/125* (2013.01); *H04L 67/34* (2013.01); *H04L 63/166* (2013.01)

(58) Field of Classification Search
CPC .......... G06F 8/61; G06F 21/00; H04L 63/166; H04L 63/02; H04L 67/125; H04L 67/34
USPC .. 726/3, 1; 709/219, 203, 205, 206; 717/176
See application file for complete search history.

(56) References Cited

U.S. PATENT DOCUMENTS

| | | | |
|---|---|---|---|
| 6,123,737 A | 9/2000 | Sadowsky | |
| 7,680,944 B1 | 3/2010 | Taghizadeh et al. | |
| 8,112,513 B2 * | 2/2012 | Margulis | G06F 3/14 709/224 |
| 2002/0091819 A1 * | 7/2002 | Melchione | H04L 12/24 709/224 |
| 2003/0009754 A1 * | 1/2003 | Rowley | G06F 8/61 717/177 |
| 2003/0018704 A1 * | 1/2003 | Polychronidis | H04L 29/06 709/202 |
| 2003/0023476 A1 | 1/2003 | Gainey | |
| 2003/0033308 A1 * | 2/2003 | Patel | G06F 11/1076 |
| 2003/0065738 A1 * | 4/2003 | Yang | G06F 8/65 709/215 |
| 2003/0093530 A1 | 5/2003 | Syed | |
| 2005/0080897 A1 | 4/2005 | Braun et al. | |

(Continued)

*Primary Examiner* — Abu Sholeman
(74) *Attorney, Agent, or Firm* — Ditthavong & Steiner, P.C.

(57) ABSTRACT

An approach is provided for extending remote network visibility for push functionality. An application is transmitted, via a push agent, from a first network to a device of a second network, wherein the device is configured to execute the application. The device is remotely controlled using the application.

16 Claims, 12 Drawing Sheets

(56) References Cited

U.S. PATENT DOCUMENTS

| | | | |
|---|---|---|---|
| 2006/0010485 A1* | 1/2006 | Gorman | G06F 21/57 |
| | | | 726/3 |
| 2006/0017551 A1 | 1/2006 | Neher et al. | |
| 2006/0031537 A1 | 2/2006 | Boutboul et al. | |
| 2006/0047927 A1 | 3/2006 | Xing et al. | |
| 2006/0248522 A1 | 11/2006 | Lakshminarayanan et al. | |
| 2007/0130457 A1 | 6/2007 | Kamat et al. | |
| 2007/0300291 A1* | 12/2007 | Bomgaars | H04L 12/2856 |
| | | | 726/3 |
| 2008/0040441 A1 | 2/2008 | Maes | |
| 2008/0172574 A1 | 7/2008 | Fisher | |
| 2008/0184241 A1 | 7/2008 | Headrick et al. | |
| 2009/0164554 A1* | 6/2009 | Wei | H04L 67/26 |
| | | | 709/202 |
| 2009/0201303 A1* | 8/2009 | Westerhoff | G06F 3/14 |
| | | | 345/520 |
| 2010/0192020 A1 | 7/2010 | Van Riel et al. | |
| 2010/0192146 A1* | 7/2010 | Stay | G06F 8/61 |
| | | | 717/176 |
| 2011/0191799 A1* | 8/2011 | Raza | H04N 5/445 |
| | | | 725/34 |

* cited by examiner

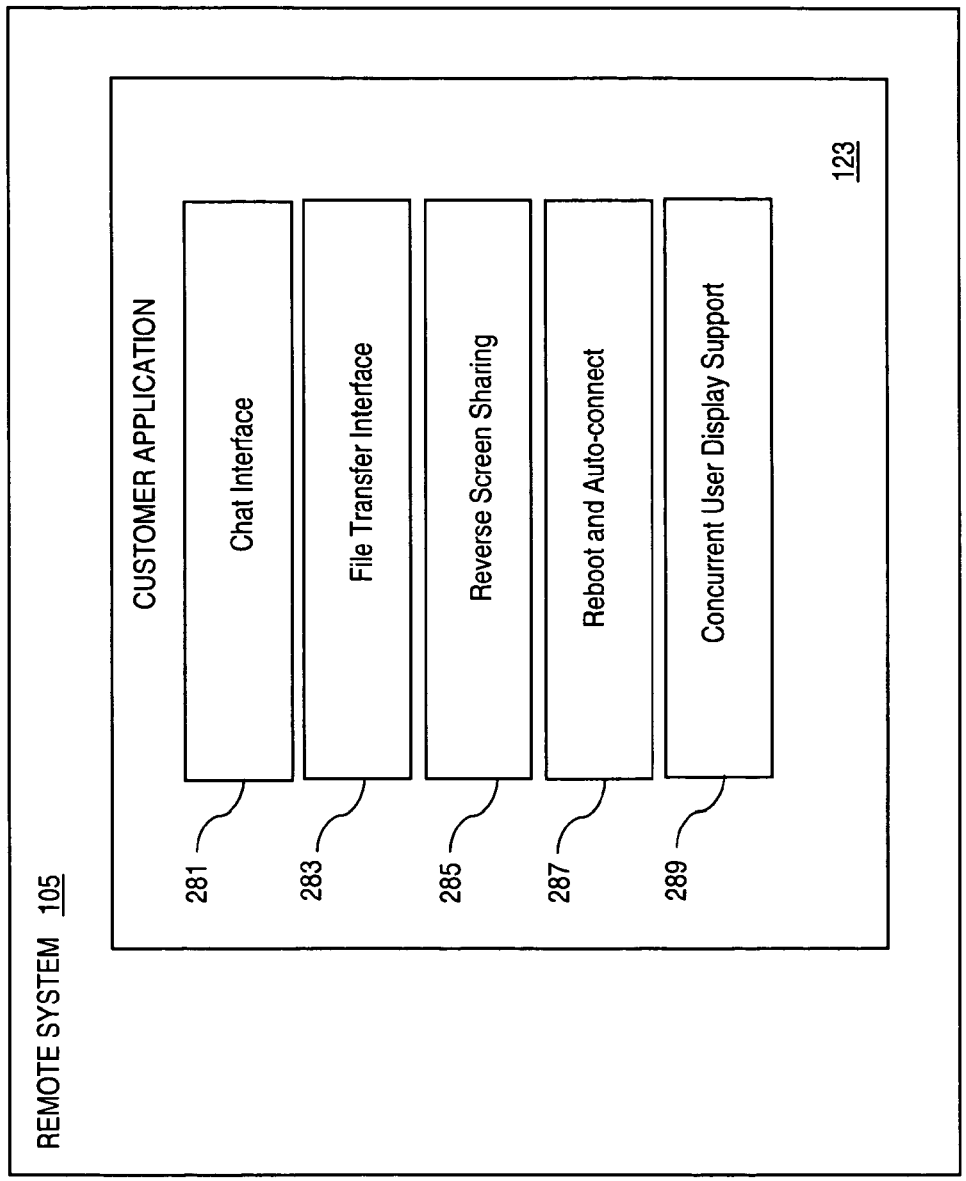

METHOD AND APPARATUS FOR EXTENDING REMOTE NETWORK VISIBILITY OF THE PUSH FUNCTIONALITY

RELATED APPLICATIONS

The present application claims priority to U.S. application Ser. No. 12/058,165 filed Mar. 28, 2008 entitled "Method and Apparatus for Extending Remote Network Visibility of the Push Functionality" which claims the benefit of the earlier filing date under 35 U.S.C. §119(e) of U.S. Provisional Application Ser. No. 60/908,890 filed Mar. 29, 2007, entitled "Method and Apparatus for Extending Remote Network Visibility of the Push Functionality"; the entirety of which is incorporated by reference.

BACKGROUND OF THE INVENTION

Information Technology (IT) companies (or departments) that manage their customers' (or organizations') computer systems are constantly challenged with the need to provide timely, secure, and cost-effective support. Remote support provides the means for IT professionals to remotely access and control customers' (or organizations') computer systems. This eliminates the need for these professionals to physically travel on-site to address a problem, thereby minimizing delay in response time.

Traditional remote support approaches possess a number of drawbacks. For example, an Application Service Provider (ASP) hosted approach (also known as Software as a Service, SaaS) requires customers to route all centrally stored or logged data communication through a $3^{rd}$ party data center, thereby potentially introducing security risks. Also, a server software installation deployment model poses complicated, costly integration issues, particularly when implemented into a large IT infrastructure (e.g., corporate network).

Without the need for pre-installed clients on a system, a local push system can be used by the representatives of a support organization to transfer an application to a remote system attended or unattended and execute the application to establish a session connection back to the representative. Unfortunately, this functionality only provides reach to systems that are visible from within the network that the support representative's computer is connected to, thereby presenting challenges to administer or support systems beyond an enterprising network—especially as the enterprise network grows or spreads to multiple locations. It encompasses many aspects of configuring and maintaining the enterprise system, for example, to distribute a necessary application and create configurations as well as providing unattended support. However, as the enterprise grows and cross one or more untrusted domains, it is impractical for the service administrator to reach each computer. Namely, if no extra means are provided, the reach of the service (e.g., control of remote computers and applications) from the support representative's computer is confined to only those computers to which network traffic is routable; consequently, service capability is limited.

Based on the foregoing, there is a clear need for approaches that enable extension of visibility of service application over network, ease of deployment, while minimizing security risks.

BRIEF DESCRIPTION OF THE DRAWINGS

The embodiments of the invention are illustrated by way of example, and not by way of limitation, in the figures of the accompanying drawings:

FIGS. 2A-2C are diagrams showing exemplary components of a network appliance, a representative application, and a customer application, respectively in the system of FIG. 1A, according to various embodiments of the invention;

DESCRIPTION OF THE PREFERRED EMBODIMENT

A method and apparatus for providing secure remote access and control are described. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Although the various embodiments of the invention are described with respect to a wired network and remote technical support services, it is contemplated that these embodiments have applicability to other networks including wireless systems, as well as other communication services.

Figure 1A:
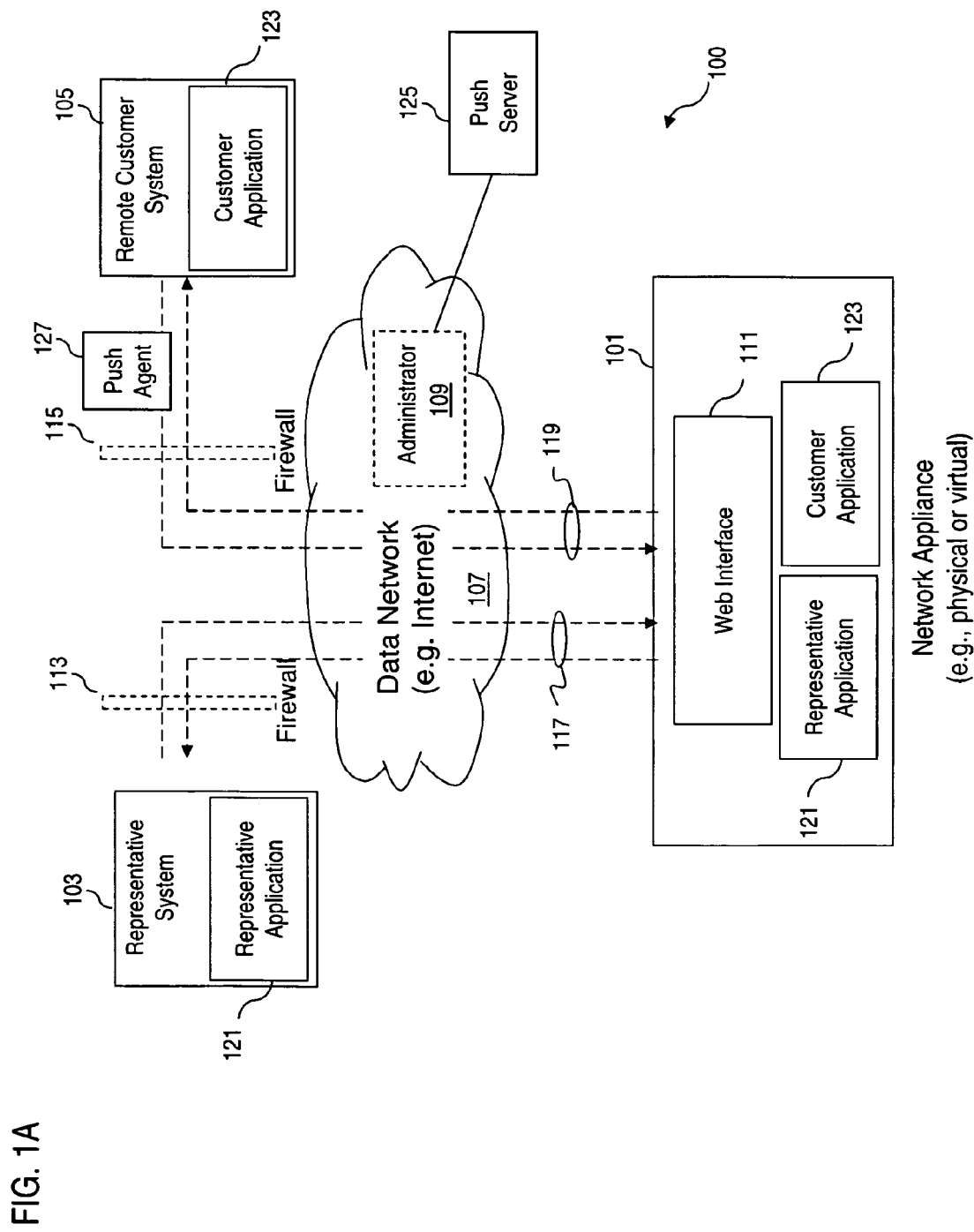
FIGS. 1A and 1B are diagrams, respectively, of a communication system and associated architecture capable of providing remote access and control using push technology, according to various embodiments of the invention.
Figure 1B:
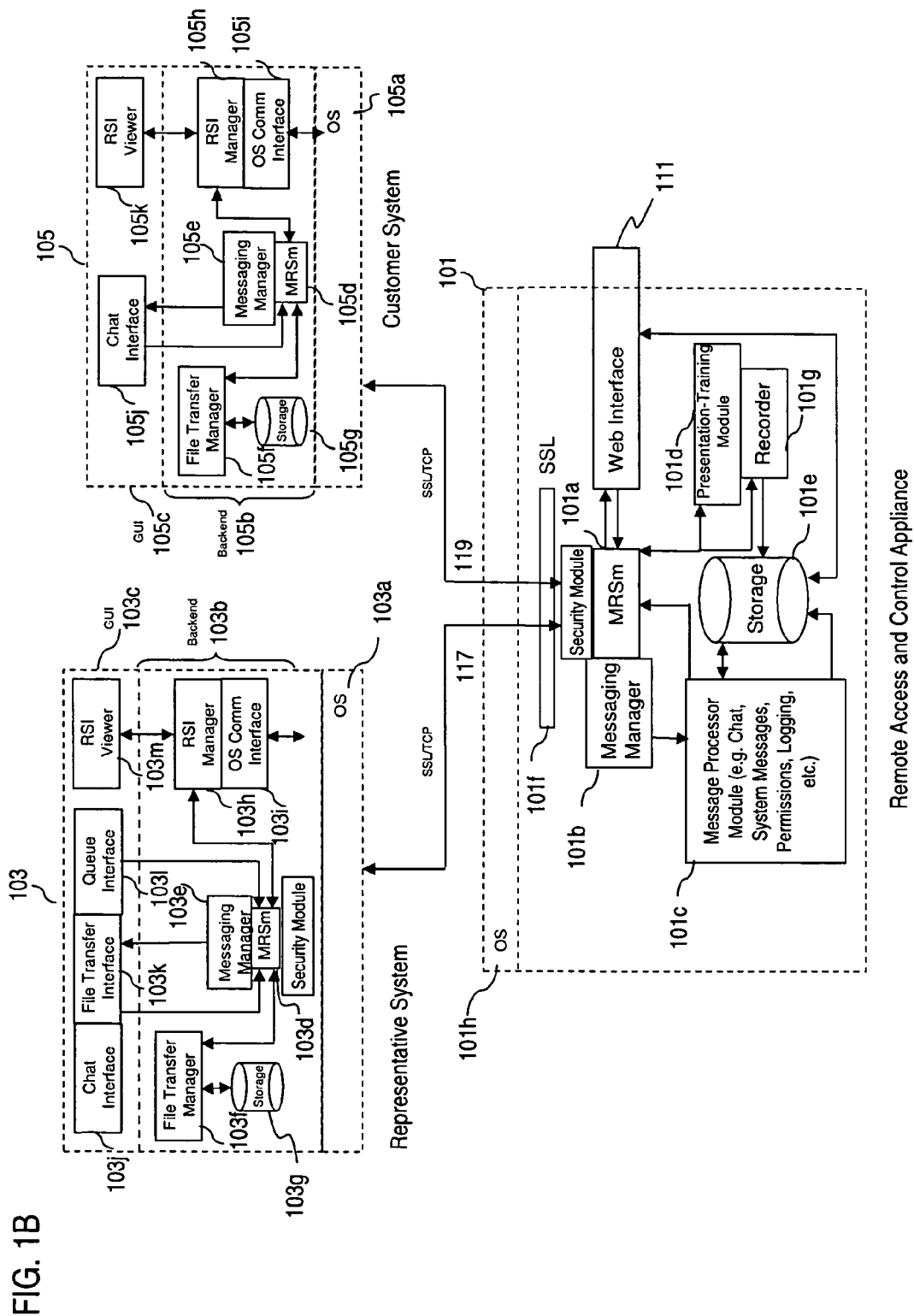

FIGS. 1A and 1B are diagrams, respectively, of a communication system and associated architecture capable of providing remote access and control using push technology, according to various embodiments of the invention. For the purposes of illustration, a communication system 100 (FIG. 1A) is described with respect to a remote support service (e.g., technical support), as facilitated by a network appliance 101, between a representative system 103 and a customer system 105. The network appliance 101, among other functions, is configured to provide remote access and control by the representative system 103 of the customer system 105, thereby enabling, for example, direct control and management of remote PC (personal computer) or remote server support. Thus, the appliance 101 is also referred to herein as a remote access and control appliance. According to one embodiment, the appliance 101 can be implemented as a standalone hardware device; alternatively, the appliance 101 can be virtualized—i.e., virtual appliance.

In this example, the representative system 103 provides, in certain embodiments, a remote support mechanism that is secure and implemented in a turnkey fashion to one or more remote customers systems 105 over a data network 107 using the network appliance 101. By way of example, the data network 107 can be an internetwork, such as the global Internet, or a private network. The traffic between the representative system 103 and any customer system 105 is handled and managed at the network appliance 101. In an exemplary embodiment, the network appliance 101 is managed by an administrator 109, who can access the network appliance 101 using a graphical user interface (GUI), such as a web interface 111. The network appliance 101, thus, has the capability of allowing on demand product use from anywhere in the world. For example, as long as the network appliance 101 is deployed accessible via a known network address (e.g., public Internet Protocol (IP) address), a support representative can log into his/her account via the web interface 111 hosted on the network appliance 101 to enable the support service functions.

The network appliance 101, according to an exemplary embodiment, is a rack-mountable device (e.g., 1U) that can be installed and deployed at the representative's organization or site; in this manner, data security is in full control of the representative's organization.

The remote access and control appliance 101 also enables the administrator 109 to change settings (configuration parameters) on the appliance 101 itself, in addition to the software it contains. The appliance 101 also provides management functions including the management of one or more representatives via the web interface 111. After physical installation of the appliance 101, the administrator 109 may log on to the appliance via the web interface 111 by using the appliance's public Uniform Resource Locator (URL) address.

In an exemplary embodiment, the representative system 103 can communicate with the customer system 105 using the network appliance 101 via the web interface 111 through one or more firewalls 113 and 115 over secure links 117 and 119. In one embodiment, the security on these links is achieved using the 256-bit Advance Encryption Standard (AES) Secure Sockets Layer (SSL). The firewalls 113 and 115 may be implemented at the representative's site, the remote customer's site, or at both sites. Alternatively, no firewall exists at either site. FIG. 1 illustrates the firewall 113 at the representative's site and the firewall 115 at the remote customer's site. According to one embodiment, the representative system 103 and the customer system 105 connect outbound to the appliance 101, thereby eliminating firewall incompatibilities. As such, the appliance 101 can operate through firewalls 113 and 115 as well as proxy servers (not shown).

The representative system 103 may provide remote support to the customer system 105 by downloading a representative application 121 from the network appliance 101 and establishing a session using the downloaded application 121. In an exemplary embodiment, the downloading (e.g., file transfer) can be executed via the web interface 111. Additionally, a customer system 105 may download a customer application 123 from the web interface 111 of the network appliance 101 to receive the necessary support service from the representative system 103. Such service can be provided by the downloaded program 121, which provides for the establishment of a support session. Once the support representative has provided the necessary support to the remote customer, the remote customer application 123 can automatically be deleted from the customer system 105. As a result, the application 123 is no longer present at the customer system 105, thereby providing for increased security.

In this exemplary scenario, the system 100 provides a push server 125 and an optional push agent 127. Within an exemplary context of remote support by remote controlling or accessing another computer, "Push" is a feature that allows support representative to transfer an application to a remote computer in need of support and have the application executed, thereby enabling the support representative to then remotely control or access the remote computer 105. No interaction is required at the remote computer 105 for the process to complete, but interaction may optionally be enabled that allows any user present at the remote computer 105 to refuse access for whatever reason. The support representative may or may not be required to have or to enter authentication/authorization credentials to gain access to the computer 105 in need of support. The requirement of credentials would depend on the transfer and/or execution method used in the push process. Furthermore, this process, unlike conventional approaches, requires no existing piece of the support product to have been previously installed on the remote computer. The push agent 127 supports a fully integrated software distribution mechanism for ease of installation of the remote access and control push agent on a managed system (e.g., remote access and control appliance or computer) over the network 107.

The push agent 127, in an exemplary embodiment, is an application installed on a computer, e.g., the remote customer system 105, that can perform the push-and-execute operation on behalf of authorized support representatives. Alternatively, the push agent 127 can be a standalone piece of hardware (e.g., network appliance) or a virtual machine (e.g., virtual appliance). The push server 125 can be an application installed on the appliance 101 or alternatively can also be a stand alone piece of hardware, as in this particular example. The push server 125 can also be a piece of software integrated into the representative client application 121 (e.g., performing its function in the background). Furthermore, this push agent 127 can be used as an agent for other purposes, such as a connection agent to another server in a particular network or another network; that is, providing a connection to and forwarding of operations via the push agent 127, from a first network to a device of a second network.

In this example, the customer client application resident 123 within the remote access and control appliance 101 or the push server 125 can be accessed by the service representative system 103, which is running the representative client application 121. The customer client application 123 can be transferred to the remote system 105 by utilizing the push agent 127 or the service representative system's representative client application 103. In this manner, the representative, for instance, can perform problem resolution, maintenance, and infrastructure development tasks quickly and easily from a single point.

Each support session is initiated by the remote customer system 105 when a support issue occurs and is then discontinued automatically when the session is complete, allowing only a small, irregular period of time wherein the support traffic is crossing the Internet. This secure architecture provides the initial level of security, obscuring the entire support process by leaving existing security structures in place and spontaneously generating each support session.

Under the above arrangement, data from a remote support session can remain secure at a facility of the support representative's organization, freeing the representative organization from the compliance liabilities involved in, for instance, using application service providers (ASPs) for remote computer support. In one embodiment, as a software/hardware approach, the network appliance 101 eliminates the risk of incompatibilities with other applications that may be running in a shared server environment.

FIG. 1B shows an exemplary software architecture of the system of FIG. 1A, according to an embodiment of the invention. The remote access and control appliance 101, in various embodiments, execute software applications that can receive, handle, manage, and dispatch system or data messages to and from the representative and customer applications residing in the representative system 103 and the customer system 105, respectively, via secure links 117 and 119.

The architecture, in one embodiment, is formed based on a message handling and routing system—denoted as a Message Router System (MRS) which includes a collection of MRS modules (i.e., MRSm 101a). The MRSm's 101a, 103d, and 105d provide a message routing system that enables the routing of data within envelopes among the appliance 101, representative system 103 and remote customer system 105 with, for example, mailboxes as data endpoints. The mailboxes, which can be used for sending and receiving data, are also responsible for all handling of encoding (creation) and decoding of message envelopes with appropriately designed read and write methods. By way of example, the message envelope can include the following fields: a fromRouterID field specifying an identifier associated with the MRS 101a, a toRouterAddress field specifying addressing information of the destination routing module.

In addition, the MRS 101a can communicate with other modules in a manner similar to that described above. By way of example, the MRSm 101a can communicate with the web interface 111, a message manager 101b, a message processor module 101c (includes chat, permission, logging, etc), a presentation-training module 101d, a secure layer module 101f (e.g., SSL wrapper module), and a recorder module 101g. The web interface 111 can communicate with other application modules via the MRS 101a.

In an exemplary embodiment, the web interface 111 includes the following: (1) a network configuration web interface; (2) a User/Admin web interface which includes but not limited to user profile configuration, log reporting interface, and administrative user interface; (3) a support portal that provides, in an exemplary embodiment, front end survey and session key submission components; and (4) a customer satisfaction (exit) survey. According to one embodiment, the web interface provides functions for configuring the appliance 101 to be deployed and integrated into the network infrastructure of the installer. In one embodiment, all other interfaces can communicate through the MRSm 101a or to a storage module 101e directly.

For ensuring proper dispatching of system messages received at the MRSm 101a, a message manager 101b can be used in this exemplary embodiment. These messages can include such data as chat data, session system data logging, system message posting, and system message queries, etc.

The message processor module 101c receives system messages from MRSm 101a via the message manager module 101b. These messages can include such date as chat, session system data logging, system message posting, system message queries, permissions queries, and storage data retrievals.

The presentation-training module 101d is configured to reduce the amount of screen update data transmitted from the client-side. In an exemplary embodiment, the presentation-training module 101d includes the following components (not shown): a viewer component, and one or more remote screen image servers. These servers collect RSI change updates and send them on to the RSI viewer via the MRSm 101a. The viewer component receives RSI update data from a client-side (remote-side in this case) server via the MRSm 101a and then sends the data off to the active servers to be transmitted to the appropriate destination. The main stream of RSI update data can be transmitted to the appropriate client via the MRSm 101a. Another stream of screen update data is transmitted to the recorder module 101g to be written into the storage module 101e.

The SSL module 101f ensures that the data transfer between the appliance 101 and the representative and customer system (103 and 105) is encrypted, e.g., 256-bit AES SSL encryption over links 117 and 119.

In one embodiment, the remote access and control appliance 101 utilizes an operating system (OS) 101h that supports a variety of applications. For example, a web server application can run on top of the OS 101h to provide web hosting capabilities. The OS 101h can also support SSL. The SSL wrapper module 101f provides SSL over Transmission Control Protocol (TCP) or other network protocols.

As described, in one embodiment, the network appliance utilizes an OS 101h with a web server for providing web hosting capabilities. The routing and handling module (e.g., MRSm) 101a, which is a transport layer atop the OS 101h, provides various network facilities. Accordingly, MRSm 101a provides the generic means of transporting data from one system to another.

The MRSm 101a of the network appliance 101 can communicate with the customer application of customer system 105, and the representative application of the representative system 103 or another appliance.

Under this example, the representative system 103 and customer system 105 include operating systems 103a, 105a; backend components 103b, 105b; and GUIs 103c, 105c. The backend components 103b of the representative system 103 can include a MRSm 103d, a message manager module 103e, and a file transfer manager module 103f. The module 103f interfaces with a storage module 103g, which is configured to store retrieved content stemming from the operation of the file transfer manager module 103f. The backend components 103b also include a RSI manager module 103h. Yet another module 103i (i.e., OS interface module), which is integral to the backend components 103b, provides communication interfaces to the OS 103a. As shown, the backend components 105b of the customer system 105 resemble that of the backend components 103b of the representative system 103: a MRSm 105d, a message manager module 105e, and a file transfer manager module 105f, a storage module 105g, a RSI manager module 105h, an OS interface module 105i.

As for the GUI 103c, the representative system 103 can provide a number of interfaces depending on the applications. For instance, the GUI 103c can include a chat interface 103j, a file transfer interface 103k, a queue interface 103l, and a viewer 103m. In this example, the customer system 105 utilizes a chat interface 105j and a viewer 105k. The GUI 103c can include other interfaces such as remote command shell, system diagnostics, and system information to name a few. The GUI 105c can include application specific chooser interface to only allow specific application viewing.

As explained with respect to the operation of the network appliance 101, the MRSm 103d is the medium for handling all messages coming to the representative application 121 and all messages sent from the representative application 121. The MRSm 103d communicates with the message manager 103e, a RSI manager 103h, and the file-transfer manager modules 103f. The system messages, session data, and chat data are delivered to the message manager module 103e. The MRSm 103d sends, as well as receives, system/control messages and RSI update data to and from the RSI manager module 103h. The MRSm 103d interacts with the file-transfer manager 103f in sending and receiving system messages and file-transfer data.

The file-transfer manager 103f handles all remote-to-local and local-to-remote (i.e. between the representative system and the customer system) reading and writing of files. The system messages and file-transfer data are received and sent through the MRSm 103d. Notably, the file-transfer interface module 103k on the GUI component 103c receives data from the MRSm 103d and sends all data directly to the MRSm 103d. Assuming the permissions to the customer file system access have been granted, the processes and steps involved in transferring a file from representative storage 103g to the customer storage 105g include an initiation of a file transfer from the file-transfer GUI, a system command message sent to the MRSm 103d. MRSm 103d delivers the command to the file-transfer manager module 103f to execute on constructing the data to be sent to MRSm 105d of the customer system 105 via the MRSm 103d. A system notification message is delivered to the message manager 103e via MRSm 103d to be displayed in the chat GUI 103j after being delivered there by the message manager 103e. The processes and steps involved in transferring a file from the customer to the representative include an initiation from the file-transfer GUI 105k, a system command message sent to the file-transfer manager 105f via the customer MRSm 105d. The file-transfer manager 105f constructs a proper remote file transfer request, which is then sent through the customer MRSm 105d to the representative MRSm 103d through the MRSm 101a on the appliance. The representative MRSm 103d receives the request command, delivering it to the remote file-transfer manager 103f, which in turn, receives the file system data requested to be transmitted back to the customer MRSm 105d by the representative MRSm 103d through the MRSm 101a on the appliance. The representative MRS 103d delivers the file system data received from the customer MRS 105d to the file-transfer manager 103f for processing and storing in the local file system storage 103g. Also, a system notification message as well as a file-transfer GUI refresh command is delivered to the file-transfer GUI 103k via the dispatcher 103e from the MRS 103d.

The RSI manager modules 103h and 105h, in one embodiment, includes the following components: a RSI updater, which "paints" the RSI viewer GUIs 103m and 105k with RSI screen update data; RSI server, which utilizes the OS Communication Interface modules 103i and 105i. The OS communication interface modules 103i and 105i interfaces with the OS system 103a and 105a for detecting and listening for screen and system updates, collecting these updates, and packaging and encoding these updates into data to be then sent to the viewing system via the respective MRSm's.

The RSI manager modules 103h and 105h can also provide the capability of reverse viewing. In this mode, the viewing of the remote system is reversed to being viewed by the remote system.

As shown, the representative system 103 and the network appliance 101 provide security features via security modules 103n and 101i. These security modules 103n and 101i are detailed with respect to FIG. 2B.

The network appliance 101 also permit support representatives to predict and lower the total cost of ownership (TCO) vis-à-vis the ASP model, in which the support representatives are typically charged a monthly fee. With the network appliance 101, representatives can predict their budget without monthly fees, surcharges or overages.

Figure 2A:
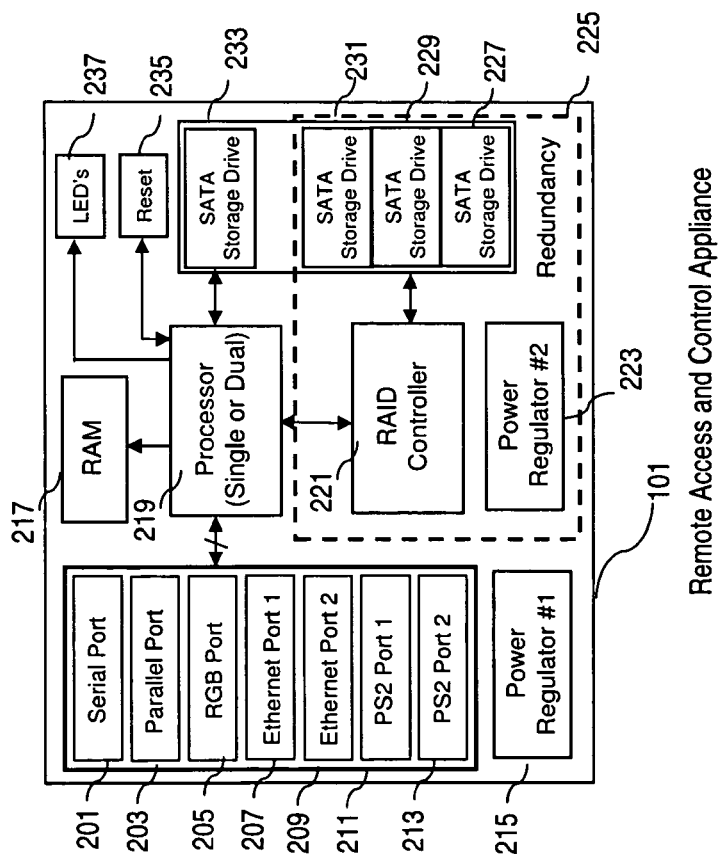
Figure 2B:
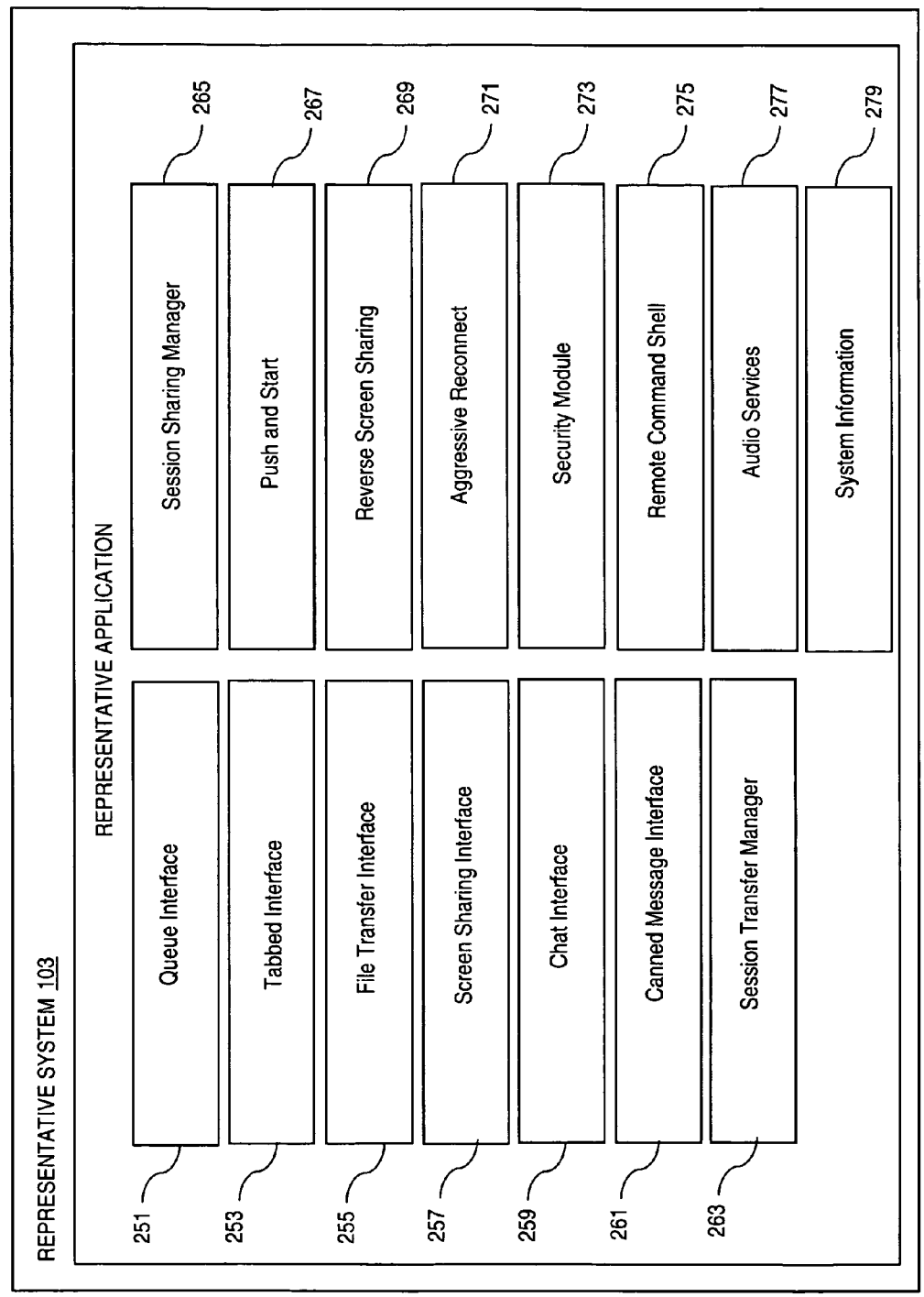

FIGS. 2A-2C are diagrams showing exemplary components of a network appliance, a representative application, and a customer application, respectively, according to various embodiments of the invention. As seen in FIG. 2A, the network appliance 101, in one embodiment, comprises various component interfaces, including serial and parallel ports 201 and 203, a display interface (e.g., an RGB (Red, Green and Blue) port 205), local area network (LAN) ports (e.g., Ethernet ports) 207 and 209, and input device ports (e.g., PS2) 211 and 213. The network appliance 101 also contains a power regulator 215, internal memory in the form of RAM (Random Access Memory) 217, one or more processors 219, each which may be a multi-core processor, LEDs (Light Emitting Diodes) 237, reset control 235 and a SATA (Serial Advanced Technology Attachment) storage drive 233.

As mentioned, the network appliance 101, in an exemplary embodiment, can be a 1U rack-mountable server hardware. However, it is contemplated that configurations other than those illustrated in FIG. 2A can be constructed, depending on the particular applications. For example, different types of appliances can be designed for different uptime requirements. With uptime-critical customers, the network appliance 101 provides for fail-over redundancies; e.g., use of multiple disk drives 227-231, for Fail-over and Hot-Swap capabilities via a RAID (Redundant Array of Independent Disks) controller 221. This configuration of the appliance 101 can also be equipped with a backup AC-DC (Alternating Current-Direct Current) regulator 223, which can be triggered when the main regulator 215 is detected as non-functional. Alternatively, for non-uptime-critical customers, the network appliance 101 can be configured without the additional hardware and/or software required for providing redundancies.

The network appliance 101 is configured to communicate with the representative system 103 and the customer system 105, and can be collocated within either of these systems 103 and 105. The network appliance 101, in various embodiments, executes software applications that can receive, handle, manage, and dispatch system or data messages to and from the representative and customer applications within the respective systems 103 and 105 via secure links 117 and 119. In one embodiment, the security on these links is achieved using the 256-bit Advance Encryption Standard (AES) Secure Sockets Layer (SSL).

As earlier described, the network appliance 101, in an exemplary embodiment, can be a virtual appliance. Such software appliance can be run in a virtual environment. For instance, an image of the operating system and base software application can be installed on a virtual machine. Virtualization provides an abstraction layer that separates the operating system from the hardware, as to permit resource sharing. In this matter, different virtual machines (using heterogeneous operating systems) can co-exist on the same hardware platform.

By way of example, the representative application 121, as seen in FIG. 2B, can provide a variety of components and functions to communicate with the network appliance 101; these components and functions are described in Table 1, as follows.

TABLE 1

| INTERFACE | DESCRIPTION |
|---|---|
| Queue Interface 251 | This interface enables multiple remote system sessions to be maintained in a prioritized queue, thereby allowing for better management of sessions between the representative and customer (that need to be handled in a timely manner). |
| Tabbed Interface 253 | This allows multiple remote system sessions to be active at the same time. |
| File Transfer Interface 255 | This interface shows the representative's and remote customer's file system on the same Interface, thereby permitting easy and effective transferring of files from the representative to the customer and from the customer to the representative. |
| Screen Sharing Interface 257 | This allows the representative to view the remote customer's system's screen and control the remote system. |
| Chat Interface 259 | This enables the user to have a full chat interface for ease of communication. |
| Canned Message Interface 261 | This interface permits the representative to send pre-built messages to improve consistency of responses to common questions. |
| Session Transfer Manager 263 | This interface enables the representative to transfer a remote system session to another user of another representative application. |
| Session Sharing Manager 265 | This process enables the representative to share a remote system session with another user of another representative application. |
| Push and Start 267 | This function enables the representative to "push" a remote application executable to a remote system within the same network domain, run the executable, and automatically connect back to start an active session with the user who initiated the push. |
| Reverse Screen Sharing 269 | This allows the representative to show the local system's screen to the remote system user. This feature has to be initiated from the representative application. |
| Aggressive Reconnect 271 | This enables sessions that are disconnected due to unforeseen network difficulties to re-connect within a defined timeout period. |
| Security Module 273 | This system governs a way of authentication in which one or more client side security modules communicate to the server side security module with appropriate credentials. The Server side security module may provide these credentials to one or more internal or external systems in an attempt to verify. The server side security modules could include LDAP, RADIUS, Kerberos, SAML, external PKI stores, and etc. The client side security modules could include communication to the user to obtain credentials, communication with the operating system or pre-installed third party APIs/libraries, or direct communication with the remote systems. |

TABLE 1-continued

| INTERFACE | DESCRIPTION |
|---|---|
| Remote Command Shell 275 | Allows the representative to access the remote system's command line interface from the representative's interface locally. |
| Audio Services 277 | This allows for means of audio communication. |
| System Information 279 | This allows the representative to request and receive the remote system's information. |

On the customer side, the customer application 123 is installed temporarily (in one embodiment), as shown in FIG. 2C. The customer application 123, in an exemplary embodiment, can be a native application, so as to achieve a reduced executable size for quick download by the remote customer from the network appliance 101. Architecturally, this application can be identical to the representative application 121. One difference with this application is the use of an uninstaller component, with which the application is capable of uninstalling itself when, for example, a session is completed with proper termination, a session is ended by the user of this customer application, or a session connection timed out.

Table 2, below, lists the exemplary capabilities of the customer application 123:

TABLE 2

| INTERFACE | DESCRIPTION |
|---|---|
| Chat Interface 281 | This interface enables the user to have a full chat interface for ease of communication. |
| File Transfer Interface 283 | This enables the remote customer to receive files transferred or offered from the representative application user via the chat interface. This also enables the customer to transfer or offer files from the remote customer system 105 to the representative system 103. Control and access to the file system of the remote customer is restricted to the permissions granted by the remote customer. |
| Reverse Screen Sharing 285 | This process permits the remote customer to view the screen of the representative. This is generally used as a tutorial tool. |
| Reboot and Auto-reconnect 287 | This component permits the representative to reboot the remote customer system 105 and on system startup, the remote customer application auto-runs and auto reconnects back to the representative application via the appliance. User intervention is not needed. |
| Concurrent User Display Support 289 | This provides the capability of receiving screen updates and messaging from any active user's interactive display on a single system/machine |

With the above arrangement, the representative application 121 via the network appliance 101 can securely communicate with the customer application 123 to access and control the customer system 105.

Figure 3:
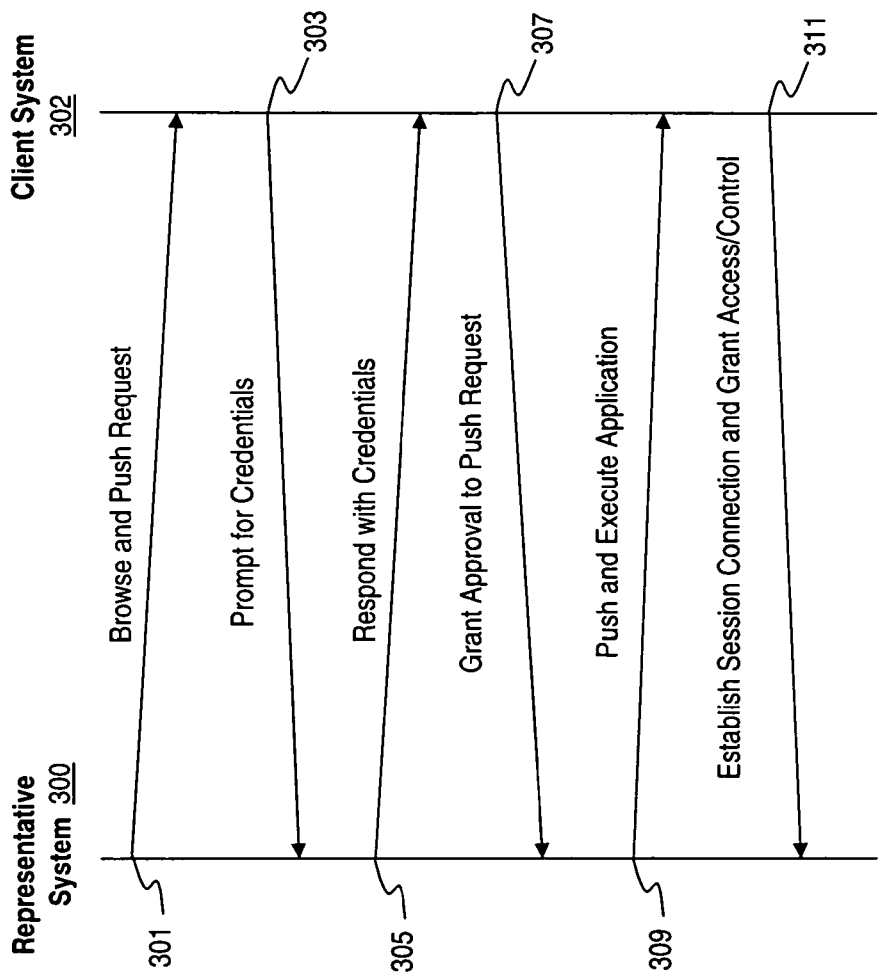
FIG. 3 is a ladder diagram of a process for establishing a remote control and access session by remote deployment and execution of an application, using the push functionality, between a representative service system and a remote client system, according to an embodiment of the invention.

FIG. 3 is a ladder diagram of a process for establishing a remote control and access session by remote deployment and execution of an application, using the push functionality, between a representative service system and a remote client system, according to an embodiment of the invention. Under this scenario, a representative system 300 is located within the same local area network (LAN) as a client system 302—that is, the push function is locally performed.

In step 301, a representative user utilizing the representative system 300 can visit the web interface 111 of the network appliance 101 (shown in FIG. 1) by entering a public Uniform Resource Locator (URL) and supplying login information to download and run the representative client. In one embodiment, the login information has been set up by an administrator of the network appliance 101. The representative client running on the representative system 103 submits a push request to the remote system 302 after selecting it from browsing of the local network. In response to the request, the client system 302 prompts the representative system 300 for appropriate system credentials according to the authentication procedure, per step 303. Next, the representative system 103 provides the requested credentials, as in step 305.

After authenticating the representative system 300, the client system 302 approves the push request (step 307). Thereafter, the representative system 300 pushes an application to the client system 302, which then executes the application (step 309) The push functionality allows transfer of the application to the client system 302 when remote service is required.

At this point, the client system 302 requests establishment of a secure connection with the representative system 300 via the network appliance 101, as in step 311. Once the secure connection is established, the representative and the customer can interact securely via the network appliance 101 for support.

Figure 4:
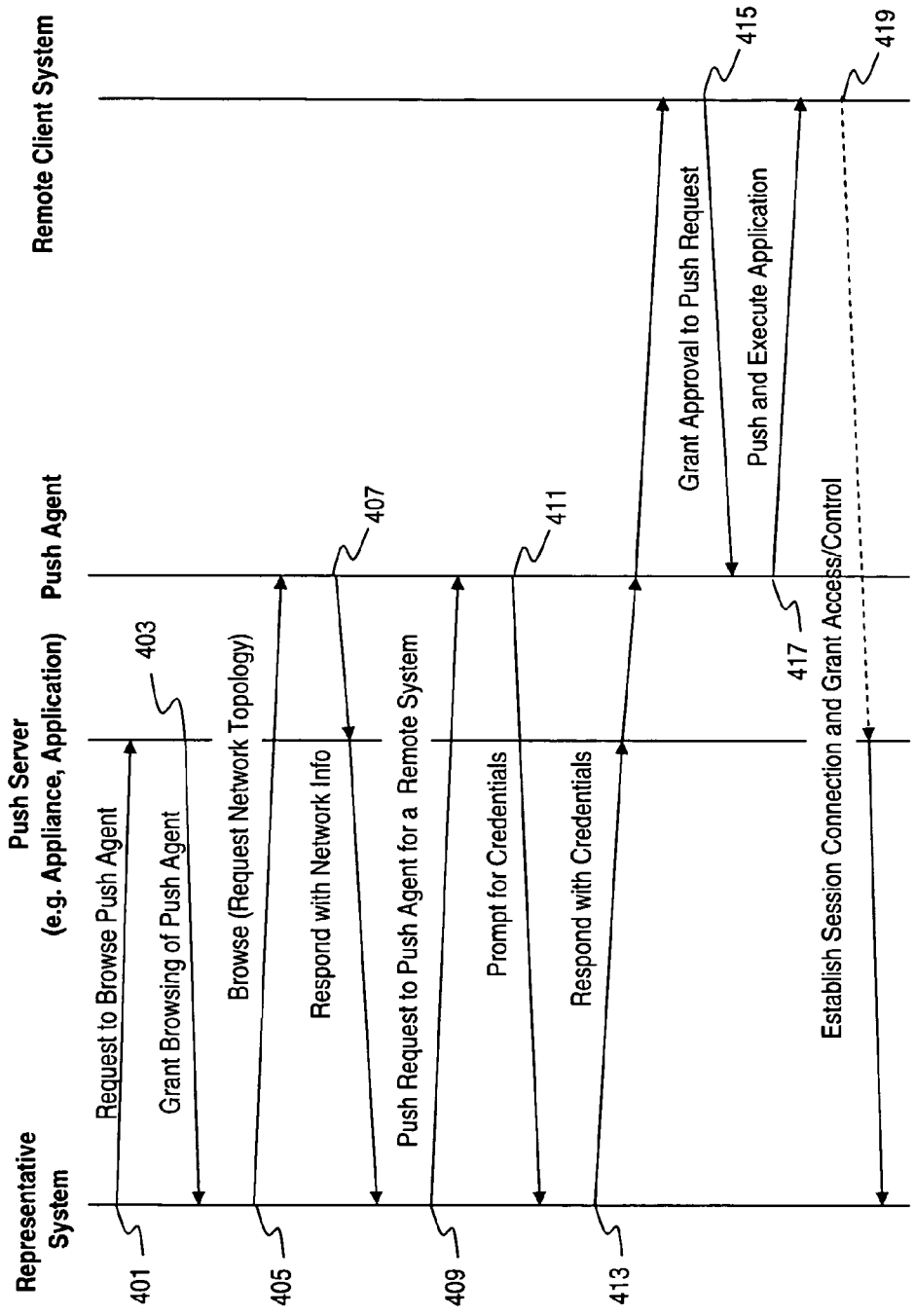
FIG. 4 is a ladder diagram of a process for establishing a remote control and access session by remote deployment and execution of an application, using a remote push agent between a representative service system and a remote client system, according to an embodiment of the invention.

FIG. 4 is a ladder diagram of a process for establishing a remote control and access session by remote deployment and execution of an application, using a remote push agent between a representative service system and a remote client system, according to an embodiment of the invention. In the above scenario of FIG. 3, it is the support representative's computer itself that performs the push operation. The network visibility of the support representative's computer is limited to the networks to which it is connected. Therefore, with no extra means provided, the reach of the push feature from the support representative's computer is limited to only those computers to which network traffic is routable. To extend this range, a push agent (e.g., push agent 127 of FIG. 1) is introduced; for example, one such an agent is known as Jumpoint™ by Bomgar™. The push agent 127, in an exemplary embodiment, is an application installed on a computer that can perform the push-and-execute operation on behalf of authorized support representatives. Alternatively, as previously mentioned, the push agent 127 can be a standalone piece of hardware (e.g., network appliance) or a virtual machine (e.g., virtual appliance). The support representatives may be in contact with the push agent by their mutual participation on an overlay network, by HTTP (Hypertext Transfer Protocol), VPN (Virtual Private Network), by programmatic email, or by any other means devised for the support representative's computer to communicate with the push agent 127.

By way of example, this process is described with respect to the system 100 of FIG. 1. Under this scenario, the representative system 103 initiates the push process of the customer client application via the push agent 127 deployed within a remote network. In one exemplary embodiment, the push agent 127 can relay the push request to another push agent (not shown), which resides within a different network. Alternatively, the representative system 103 can directly instruct the push agent 127 to transfer the customer client application 123 to the remote client system 105. The customer client application 123 can be pushed to the remote system of the different network by the push agent 127. In this manner, a service representative can perform push and execute operation on behalf of the authorized representative system by communicating with the push server 125.

In step 401, the representative system 103 communicates with the push server 125 to request browsing of the push agent 127, which, similar to the main appliance 101, can provide a web interface. The push server 125, as in step 403, grants the request. Accordingly, the representative system 103 contacts the push agent 127 to obtain network information, such as network topology, per steps 405 and 407. Next, the representative system 103 sends a push request to the push agent 127 regarding the remote system 105, as in step 409.

The push agent 127 responds by requesting for appropriate credentials to the remote system 105 from the representative system 103, as in step 411. The credentials are subsequently supplied by the representative system 103 to the push agent 127, which in turn, relays the information to the remote system 105 (step 413). In step 415, the remote system 105 communicates the acceptance of the push request to the push agent 127. In steps 417 and 419, the remote system 105 receives the application and automatically executes it to establish a communication with the representative system 103 via the network appliance 101 (which in this example functions as a push server as well).

Figure 5:
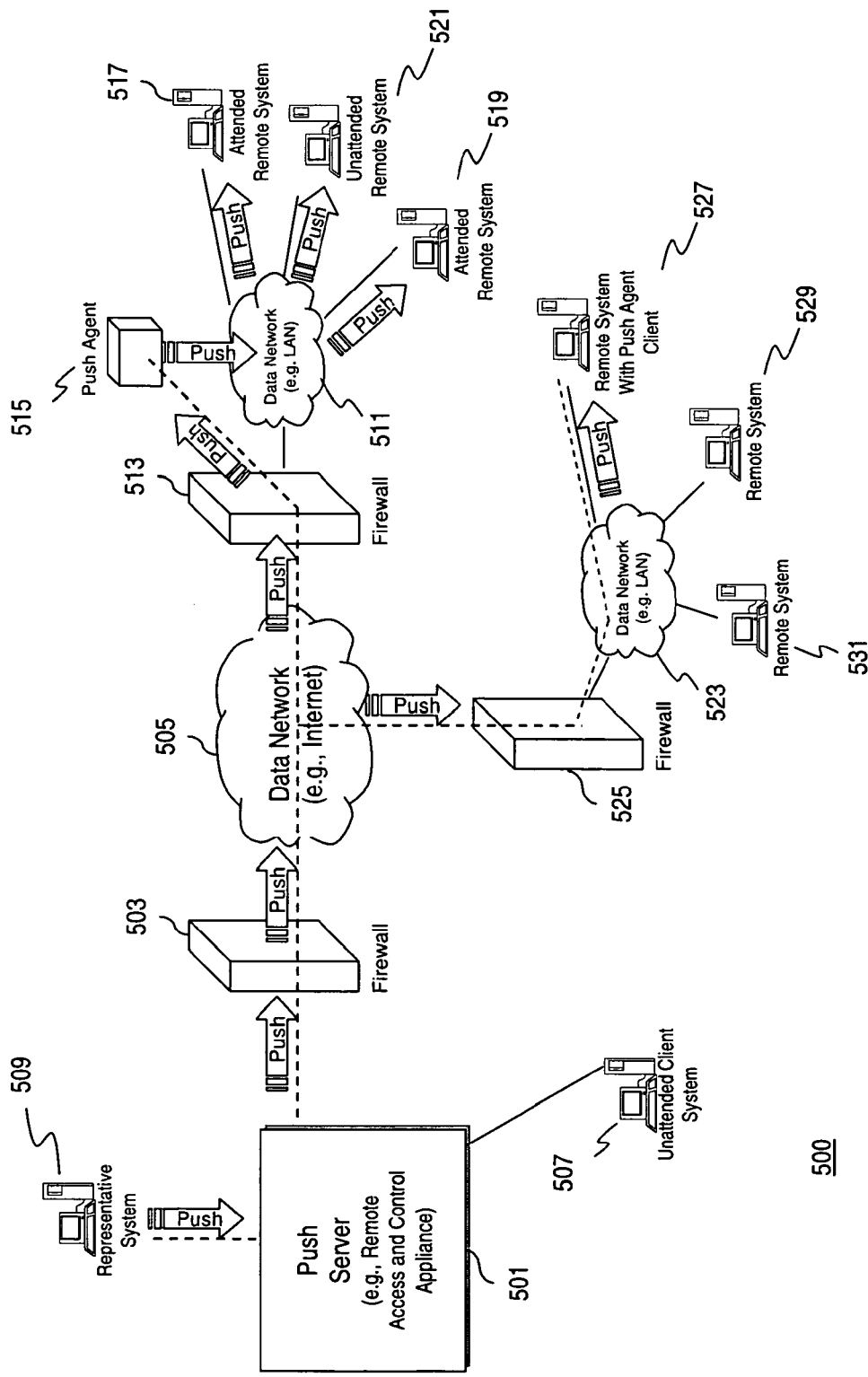
FIG. 5 is a diagram of an exemplary communication system capable of extending visibility to remote networks, according to an embodiment of the invention.

FIG. 5 is a diagram of an exemplary communication system capable of extending visibility to remote networks, according to an embodiment of the invention. A communication system 500 includes a push server 501 that is implemented within a remote access and control appliance (e.g., appliance 101 of FIG. 1). The push server 501 resides behind a first firewall 503, which interfaces with a data network 505, such as the global Internet. To illustrate the capability to extend network visibility, three different network scenarios are described. In the first scenario, an unattended client system 507 resides on the same network as the push server 501 and a representative system 509. Another scenario involves data network 511, which includes a firewall 513 to guard against security compromises, and a push agent 515, which serves both attended remote systems 517, 519 and unattended remote system 521. In the third scenario, data network 523 also employs a firewall 525, but rather than utilize a push agent, push agent clients are installed in one or more of the remote systems 527-531, for example. One such push agent client is that of a Jump™ client by Bomgar™.

The push agent 515 can be used as an agent for other purposes as well, such as a connection agent to another server (not shown) in another network; that is, providing a connection to and forwarding of operations via the push agent 151, from one network to a device of another network.

After the support representative system 509 connects to the remote push agent 515 (which resides within an appliance or a computer) as deployed by the push server 501, the service representative system 509 prompts the remote push agent 509 to transfer an application to the remote computer (e.g., system 517), which resides outside of the network of the representative system 509. In an exemplary embodiment, a representative client or a web browser based remote control is available and can perform a push instruction from a remote site to a targeted push agent. Upon receiving a request, the remote push agent 515 transfers the application to the remote system 517. In this manner, integrated remote access and control tools enable both efficient remote problem resolution and critical visibility limitation when deploying application to the targeted client remote system 517. This arrangement also enables a service representative to efficiently implement application tools and maintain security throughout the network 500 directly from the a representative's desk.

In an exemplary embodiment, the appliance 501 uses certificate-based authentication to establish a persistent connection to the push agent 515. When requesting a remote control session on the remote system 517 via the push functionality, the appliance 501 ensures that the representative system 509 has the proper authorization to push the customer client application to the targeted remote system 517. The customer client application then can be transferred from the push agent 515 to the remote client system 517. The remote client system 517 can then establish a session connection to the representative system 509.

The push agent 515 can be designed to not only extend the reach of a clientless remote system to the representative system 509, but to also provide other functionalities. It is recognized that there are situations where remote systems require remote support, but are not configured to have external Internet access. In such a scenario, these remote systems cannot readily access the website of the network appliance 501 for executing an attended support session. Therefore, the push agent 515 can in this scenario provide a support website that communicates back to the main appliance 501 for session initiation. Alternatively, push agent clients can be installed to permit sending of data via a tunnel through it for outgoing system updates.

In the scenario where the representative system 509 and the customer system 517 reside in a different network to which the network appliance 501 resides in, the latency of the data travelling from the representative system 509 through the appliance 501 to the supported system 517 and vice-versa can impact the session performance. Hence, the push agent 515 can provide a central host for all through data traffic and act as the on-site appliance to preserve the data security model of the product. The data logged on the push agent 515 can be uploaded to the main appliance 501 for complete audit data security. This not only keeps the data security model intact, but provides enhanced session performance.

The operation of system 500 under the three different networking scenarios is now described.

Figure 6:
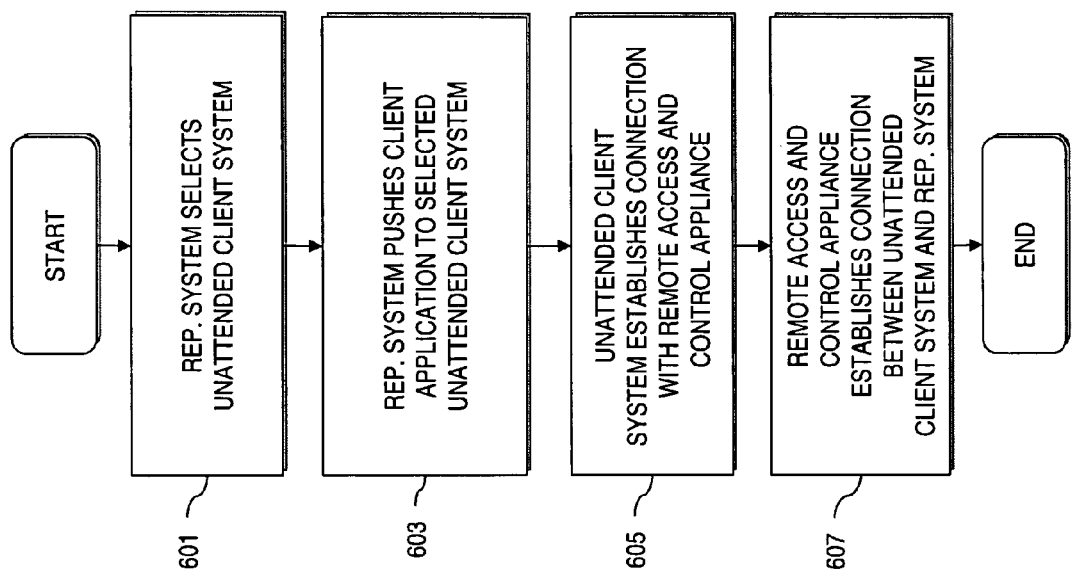
FIG. 6 is a flowchart of a process for providing clientless unattended support in a local area network (LAN) environment of the system of FIG. 5, according to an embodiment of the invention.

FIG. 6 is a flowchart of a process for providing clientless unattended support in a local area network (LAN) environment of the system of FIG. 5, according to an embodiment of the invention. In the case of the clientless unattended support session, the unattended client system 507 is to be controlled by the representative system 509. In step 601, the representative system 509 selects the unattended client system 507, which receives an application pushed by the representative system 509 (step 603). In one embodiment, the actual push of software to the remote computer 507 and its execution can be accomplished via SMB (System Management Bus), Windows RPC (Remote Procedure Calls)/IPC (Inter Process Communication), Unix/Posix RPC, FTP (File Transfer Protocol), SSH (Secure Shell), HTTP (Hypertext Transfer Protocol) or other means.

After executing the application, the unattended client system 507 establishes a connection with the remote access and control appliance, which in this case serves as the push server 501, per step 605. In step 607, the remote access and control appliance 501 establishes a session between the representative system 509 and the unattended client system 507.

No interaction is required at the remote computer 507 for the process to complete, but interaction may optionally be enabled that allows any user present at the remote computer 507 to refuse access for whatever reason. The support representative may or may not be required to have or to enter authentication/authorization credentials to gain access to the computer 507 in need of support. The requirement of credentials would depend on the transfer and/or execution method used in the push process. Furthermore, this process requires no existing piece of the support product to have been previously installed on the remote computer.

Figure 7:
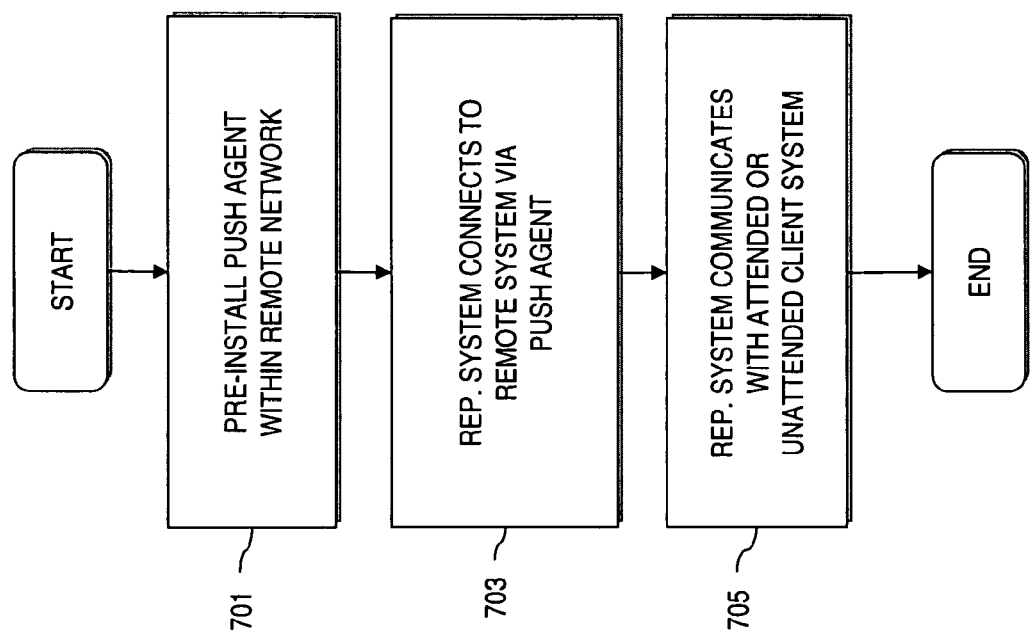
FIG. 7 is a flowchart of a process for remotely providing clientless unattended support in the system of FIG. 5, according to an embodiment of the invention.

FIG. 7 is a flowchart of a process for remotely providing clientless unattended support in the system of FIG. 5, according to an embodiment of the invention. In the scenario of FIG. 6, it is the representative system 509 itself that performs the clientless "Jump" operation. In such a scenario, the network visibility of the support representative system 509 is limited to the networks to which it is connected. To extend this range, the push agent 515 is introduced.

In this scenario, the push agent 515 is pre-installed, as in step 701. The push agent 515 communicates with the target remote system 517-521 to push the customer application onto these systems. The representative system 509 can connect to either the attended remote system 517 or the unattended remote system 521 (step 703), depending on which system the representative system 509 has selected. Thereafter, the representative system 509 communicates, as in step 705, with the selected remote system, e.g., attended remote system 517 or the unattended remote system 521.

Figure 8:
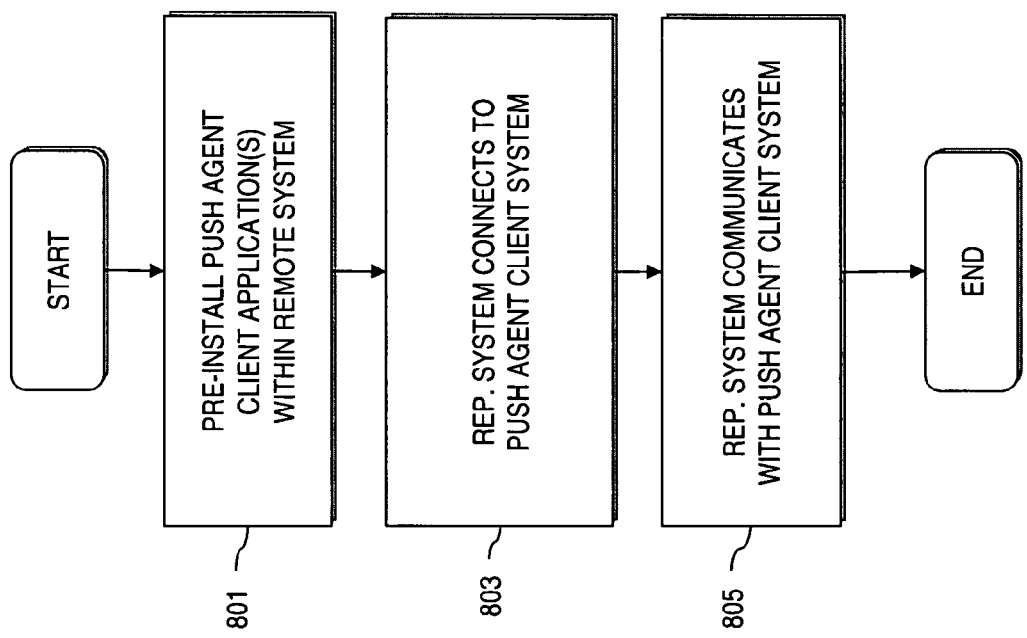
FIG. 8 is a flowchart of a process for remotely providing client-based unattended support in the system of FIG. 5, according to an embodiment of the invention.

FIG. 8 is a flowchart of a process for remotely providing client-based unattended support in the system of FIG. 5, according to an embodiment of the invention. This example concerns the data network 523 of FIG. 5, wherein push agent clients can be installed in the remote systems, such as remote system 527. This allows users who are not able to take advantage of the clientless unattended support due to network configuration to still provide unattended support. Push agent clients can be installed either during a regular attended support session or by mass deployment of push agent clients to multiple systems at one time (step 801).

The representative system 509 can thus access the remote system 527 by initiating a session with the push agent client (step 803). When the push agent client receives the session initiation request, it establishes a connection back to the appliance 501 to complete the session establishment, per step 805.

The processes described herein for providing secure, on-demand remote support may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 9:
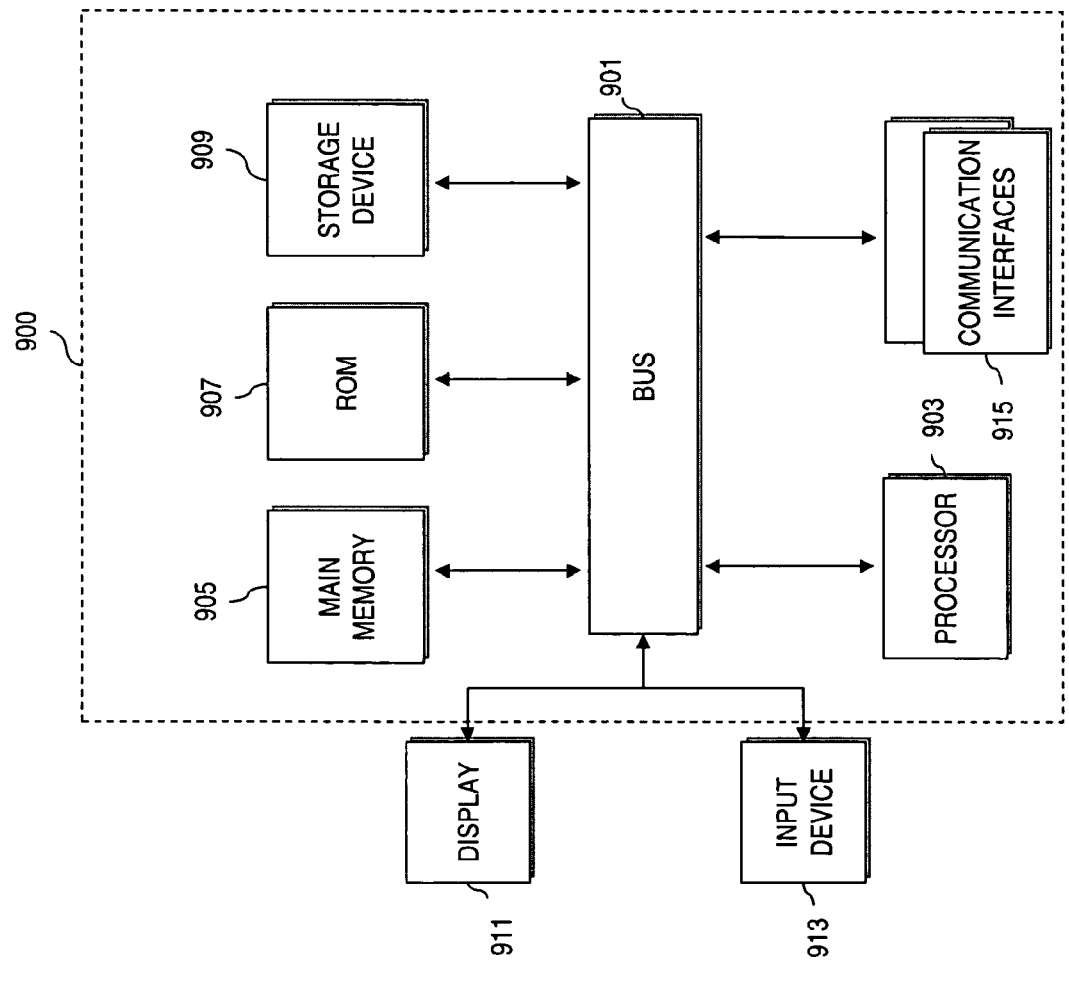
FIG. 9 is a diagram of a computer system that can be used to implement various embodiments of the invention.

FIG. 9 illustrates a computer system 900 upon which an embodiment according to various exemplary embodiments can be implemented. For example, the processes described herein can be implemented using the computer system 900. The computer system 900 includes a bus 901 or other communication mechanism for communicating information and a processor 903 coupled to the bus 901 for processing information. The computer system 900 also includes main memory 905, such as a random access memory (RAM) or other dynamic storage device, coupled to the bus 901 for storing information and instructions to be executed by the processor 903. Main memory 905 can also be used for storing temporary variables or other intermediate information during execution of instructions by the processor 903. The computer system 900 may further include a read only memory (ROM) 907 or other static storage device coupled to the bus 901 for storing static information and instructions for the processor 903. A storage device 909, such as a magnetic disk or optical disk, is coupled to the bus 901 for persistently storing information and instructions.

The computer system 900 may be coupled via the bus 901 to a display 911, such as a cathode ray tube (CRT), liquid crystal display, active matrix display, or plasma display, for displaying information to a computer user. An input device 913, such as a keyboard including alphanumeric and other keys, is coupled to the bus 901 for communicating information and command selections to the processor 903. Another type of user input device is a cursor control 915, such as a mouse, a trackball, or cursor direction keys, for communicating direction information and command selections to the processor 903 and for controlling cursor movement on the display 911.

According to one embodiment contemplated herein, the processes described are performed by the computer system 900, in response to the processor 903 executing an arrangement of instructions contained in main memory 905. Such instructions can be read into main memory 905 from another computer-readable medium, such as the storage device 909. Execution of the arrangement of instructions contained in main memory 905 causes the processor 903 to perform the process steps described herein. One or more processors in a multi-processing arrangement may also be employed to execute the instructions contained in main memory 905. In alternative embodiments, hard-wired circuitry may be used in place of or in combination with software instructions to implement the certain embodiments. Thus, the exemplary embodiments are not limited to any specific combination of hardware circuitry and software.

The computer system 900 also includes a communication interface 917 coupled to bus 901. The communication interface 917 provides a two-way data communication coupling to a network link 919 connected to a local network 921. For example, the communication interface 917 may be a digital subscriber line (DSL) card or modem, an integrated services digital network (ISDN) card, a cable modem, a telephone modem, or any other communication interface to provide a data communication connection to a corresponding type of communication line. As another example, communication interface 917 may be a local area network (LAN) card (e.g. for Ethernet™ or an Asynchronous Transfer Model (ATM) network) to provide a data communication connection to a compatible LAN. Wireless links can also be implemented. In any such implementation, communication interface 917 sends and receives electrical, electromagnetic, or optical signals that carry digital data streams representing various types of information. Further, the communication interface 917 can include peripheral interface devices, such as a Universal Serial Bus (USB) interface, a PCMCIA (Personal Computer Memory Card International Association) interface, etc. Although a single communication interface 917 is depicted in FIG. 9, multiple communication interfaces can also be employed.

The network link 919 typically provides data communication through one or more networks to other data devices. For example, the network link 919 may provide a connection through local network 921 to a host computer 923, which has connectivity to a network 925 (e.g. a wide area network (WAN) or the global packet data communication network now commonly referred to as the "Internet") or to data equipment operated by a service provider. The local network 921 and the network 925 both use electrical, electromagnetic, or optical signals to convey information and instructions. The signals through the various networks and the signals on the network link 919 and through the communication interface 917, which communicate digital data with the computer system 900, are exemplary forms of carrier waves bearing the information and instructions.

The computer system 900 can send messages and receive data, including program code, through the network(s), the network link 919, and the communication interface 917. In the Internet example, a server (not shown) might transmit requested code belonging to an application program for implementing an exemplary embodiment through the network 925, the local network 921 and the communication interface 917. The processor 903 may execute the transmitted code while being received and/or store the code in the storage device 909, or other non-volatile storage for later execution. In this manner, the computer system 900 may obtain application code in the form of a carrier wave.

The term "computer-readable medium" as used herein refers to any medium that participates in providing instructions to the processor 903 for execution. Such a medium may take many forms, including but not limited to non-volatile media, volatile media, and transmission media. Non-volatile media include, for example, optical or magnetic disks, such as the storage device 909. Volatile media include dynamic memory, such as main memory 905. Transmission media include coaxial cables, copper wire and fiber optics, including the wires that comprise the bus 901. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out various exemplary embodiments may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

While the invention has been described in connection with a number of embodiments and implementations, the invention is not so limited but covers various obvious modifications and equivalent arrangements, which fall within the purview of the appended claims.

What is claimed is:

1. A method comprising:
   receiving a request to communicate with a push agent, the request being received at a network appliance that is configured to execute a push server;

initiating transmission of an application from the network appliance, by the push agent in response to the request, the application being transmitted from a first network to a device of a second network, the network appliance provides remote access and control of the device to another device on another network, wherein the remote access and control is provided on behalf of a representative system, the representative system being configured to request network topology information of the second network by the push agent; and executing the application at the device to establish a connection between the device and the network appliance for use in remotely controlling the device via the network appliance.

2. A method according to claim 1, further comprising:

establishing a segment of the connection from the network appliance to the device by the push agent, the network appliance being within the first network;

logging activities of the device at the network appliance over the connection; and routing the activities to the another device.

3. A method according to claim 1, wherein the device is either an unattended system or an attended system.

4. A method according to claim 1, wherein the push agent is installed using the push server.

5. A method according to claim 1, wherein the push agent is installed within the second network as a standalone device or a virtual machine.

6. A method according to claim 1, wherein, prior to transmission of the application, the device of the second network has no previously installed application for establishing the connection between the device and the network appliance.

7. An apparatus comprising:

at least one processor; and at least one memory including computer program code for one or more programs, the at least one memory and the computer program code configured to, with the at least one processor, cause the apparatus to perform at least the following, cause, at least in part, to execute a push server, and to receive a request to communicate with a push agent, and initiate transmission of an application from the network appliance, by the push agent, from a first network to a device of a second network, wherein the device is configured to execute the application at the device; and the network appliance provides remote access and control of the device to another device on another network, via the apparatus is granted responsive to execution of the application, wherein the remote access and control is provided on behalf of a representative system, the representative system being configured to request network topology information of the second network by the push agent.

8. An apparatus according to claim 7, wherein the apparatus is further configured to establish a segment of the connection, by the push agent, from the first network to the device, to log activities of the device over the connection, and to route the activities to the another device.

9. An apparatus according to claim 7, wherein the device is either an unattended system or an attended system.

10. An apparatus according to claim 7, wherein the push agent is installed using the push server.

11. An apparatus according to claim 7, wherein the push agent is installed within the second network as a standalone device or a virtual machine.

12. A method comprising:

receiving a request at a network appliance that is configured to execute a push server;

initiating transmission of an application from the network appliance in response to the request, the application being transmitted from a first network to a device of a second network, the network appliance provides remote access and control of the device to another device on another network, wherein the remote access and control is provided on behalf of a representative system, the representative system being configured to request network topology information of the second network; and executing the application at the device to establish a connection between the device and the network appliance for use in remotely controlling the device via the network appliance.

13. A method according to claim 12, further comprising:

logging activities of the device at the network appliance over the connection and routing the activities to the another device.

14. A method according to claim 12, wherein the device is either an unattended system or an attended system.

15. A method according to claim 12, wherein, prior to transmission of the application, the device of the second network has no previously installed application for establishing the connection between the device and the network appliance.

16. A method according to claim 1, wherein the another device on another network is for remote support of the device of the second network.

* * * * *